United States Patent Office 2,923,662
Patented Feb. 2, 1960

2,923,662

APPETITE DEPRESSANT RESIN

Richard Louis Markus, Montclair, and Edward R. Neary, Teaneck, N.J., assignors to White Laboratories, Inc., Kenilworth, N.J., a corporation of New Jersey No Drawing. Application July 11, 1957
Serial No. 671,128

4 Claims. (Cl. 167—55)

This invention relates to a swellable resin useful as an appetite depressant, and is more expressly concerned with 2-vinylpyridine which has been copolymerized and cross-linked with p,p'-diisopropenyldiphenylmethane.

This invention is bottomed on the finding that an anion adsorbent resin, comprising 2-vinylpyridine which has been copolymerized with between about 1.3 and about 1.8 percent of p,p'-diisopropenyldiphenylmethane as a cross-linking agent, swells appreciably in the gastric juices of the stomach thus producing an appetite depressing effect. The resin does not swell appreciably with water, but does swell greatly in the gastric juices of the stomach. The amount of this swelling effect depends upon the pH of the body juices to which said resin is exposed. In the stomach, the gastric juice is about 0.1 normal hydrochloric acid and has a pH of about 1–2.5. In that setting the resin will swell up greatly by adsorbing over 100 times its dry weight of the gastric juices. The resin quickly loses its ability to hold gastric juices as the pH of the juices is increased and at pH's above about 4, the resin does not hold any appreciable amount of body juices. Thus, as the resin, in tablet or wafer form, is swallowed, it swells to its maximum size in the stomach where it produces a feeling of "fullness" which serves to depress the appetite. Then as the resin passes through the stomach along the digestive tract, the pH of the natural body fluids is increased and the resin shrinks. Thus, contrary to carboxymethylcellulose and other bulking agents used as appetite depressants, the resin swells only in the stomach where its swellability is useful, and does not remain bulky after leaving the stomach where this property is no longer desirable.

In order to have this utility as an appetite depressant, the 2-vinylpyridine must be polymerized with a small amount of p,p'-diisopropenyldiphenylmethane as a cross-linking agent. About 1.3 to about 1.8 percent of the cross-linking agent is operable with 1.59 percent of the cross-linking agent being the preferred resin.

The manufacture of the resin and its swellability and physical characteristics may be improved by the use of certain food-grade non-toxic polymer lubricants e.g. Myverol and Myvacet lubricants, which are acetylated glyceryl stearates or glyceryl distearate, etc., used in amount of between 1 and 20 percent, preferably about 13 percent by weight of the resin. The lubricant is preferably added to the resin during the manufacture thereof. The use of a food grade polymer lubricant makes it easier to separate the resin from the drying pan, and causes it to lose its grittiness when chewed.

To further illustrate the swelling characteristics of the preferred resins of the present invention, the swelling in terms of cubic centimeters of hydrochloric acid solution adsorbed per gram of resin was measured at various pH's, with the following results:

| pH: | Swelling (cc./gram) |
|---|---|
| 0 | 30 |
| 1 | 130 |
| 2 | 200 |
| 2.5 | 180 | and using various McIlvaine citrate-phosphate buffers (made from dibasic sodium phosphate and citric acid) the results were:

| pH: | Swelling (cc./gram) |
|---|---|
| 2.2 | 96 |
| 3 | 64 |
| 4 | 62 |
| 5 | 30 |
| 6 | 5 |

The resin of the present invention can be made by a process described and claimed in a copending application Serial No. 439,875, filed June 28, 1954, entitled "Batchwise Copolymerization Technique," now U.S. Patent 2,810,716.

The following examples illustrate this method of making the resin, but is not to be construed as limiting:

EXAMPLE 1

A mixture of 200 grams of 2-vinylpyridine and 3.18 grams of p,p'-diisopropenyldiphenylmethane using 0.60 gram of azobisisobutyronitrile as an initiator was heated in an aqueous solution of disodium phosphate for 150 minutes at 92 degrees centigrade. The resin was separated by filtration and dried. There was thus obtained 170 grams of resin swellable in 0.1 N hydrochloric acid to the extent of 130 cubic centimeters per gram, and in artificial gastic juice to 100 cubic centimeters per gram.

EXAMPLE 2

Into a stirred hot salt brine consisting of 47.6 kg. disodium phosphate anhydrous and 72.4 liters of water (of a temperature of around 90–95° C.) were introduced a solution of 3000 grams 2-vinylpyridine, 47.6 grams p,p'-diisopropenyldiphenylmethane, and 9 grams azobisisobutyronitrile. The suspension was stirred and maintained at the temperature of about 95° C. for at least 2 hours. Then the resin was filtered from the hot brine, heated with dilute mineral acid first, then treated with hot water several times until the excess of acid has been removed. Then about 13 percent of a food grade lubricant ("Myvacet," one of the distilled acetylated monoglycerides) was dissolved or suspended in a small amount of methanol and added to the fully swollen resin. The resin then was treated and precipitated with an excess of 10 percent ammonia, washed with soft water and subsequently dried. Approximately 2.5 kg. (or a yield better than 80 percent) of the appetite depressant 2-vinylpyridine resin was obtained. The swelling of this type of resin was tested and found to be 75–95 cc./gm. in artificial gastric juice.

The p,p'-diisopropenyldiphenylmethane used to make the resin of the present invention is made by a process described and claimed in copending application Serial No. 671,127, filed even date herewith, entitled "Process for Preparing Diisopropenyldiphenyl and Homologs Thereof." The following preparation shows just how it is made:

Preparation: p,p'-diisopropenyldiphenylmethane

STEP A

To a suspension of 15.5 kilograms (116 moles of anhydrous aluminium chloride), in 22.7 kilograms of carbon disulfide was added a solution of 8.5 kilograms (108.4 moles) acetyl chloride, 6.05 kilograms (36 moles) of diphenyl methane in 9 kilograms of carbon disulfide. In the course of 4 hours under stirring and ice-salt brine cooling during the addition of the reagents, the inside temperature was kept in the neighborhood of +3 degrees centigrade.

The mixture was allowed to stand overnight, and the next morning carbon disulfide was recovered by distillation at a jacket temperature of about 58 degrees centigrade. After about 10 hours of heating at this temperature, the distillation of the carbon disulfide was completed; the residue of the reaction mixture was cooled with well water and quenched by the addition of crushed ice. After isolating the reaction mixture on a Buechner funnel under mild suction, the solids were washed with an excess of water. Soon the oily particles of the reaction mixture have penetrated the filter medium and reappeared forming a liquid second phase in the aqueous filtrate which was subsequently discarded. The crude solids were air dried weighing 8.1 kilograms. Upon recrystallization from acetone, totally 6.173 kilograms of pure diketone, p,p'-dicetyldiphenylmethane, melting point 88–90 degrees centigrade were obtained, yield: 77.1 percent of the theory. The diketone has been identified by oxime titration, according to D. M. Smith and J. Mitchell, Jr., Anal. Chem. 22:750 (1950).

STEP B

To 18.9 liters of an etheric solution containing 63 moles of $CH_3MgBr$ stirred in a jacketed reaction kettle were added a suspension of 6 kilograms of p,p'-diacetyldiphenylmethane (from Step A) in 59.5 liters of benzene. The addition of the slurry was complete within 4 hours while the temperature of the jacket-cooled kettle was kept below $+22$ degrees centigrade. The temperature of the jacket was then gradually raised and kept at 85 degrees centigrade for the next 15 hours during which period the ether and most of the benzene were distilled off. Upon cooling, the reaction mixture was quenched with about 200 pounds of chopped ice and by the gradual addition of a solution of 3.6 kilograms of $NH_4Cl$ in 12 liters of soft water. The mixture was allowed to stand for 1 hour when the greatest part of the aqueous layer could be separated from the benzene solution. The solids suspended in the aqueous layer were isolated by filtration and washed subsequently with water. The remaining benzene solution was then distilled in vacuo at a jacket temperature of 42 degrees centigrade to a pasty consistency. To the mixture was then added 6 liters of water and the last traces of benzene were removed by distillation in vacuo. Upon cooling about 60 pounds of chopped ice were added to the reaction mixture permitting the separation of the low melting solids by filtration of a Buechner. After washing the off-white colored powdery solids with water and drying totally 7.357 kilos of crude diol, p,p'-diphenylmethane diisopropyl carbinol, were obtained. 6000 grams of diketone could produce a theoretical maximum yield of $$\frac{284}{252} \times 6000 = 6760 \text{ grams of diol}$$

The crude diol of 7.357 kilograms contains therefore not more than $$\frac{6760}{7357} \times 100 = 91.8 \text{ percent of pure diol}$$

One gram of this crude diol was recrystallized from the mixture of 4 cc. of benzene and 0.4 cc. of cyclohexane, giving 0.065 gram of pure diol (white crystals) melting point 70–1 degrees centigrade.

STEP C

To 300 grams of crude diol, p,p'-diphenylmethane diisopropyl carbinol (containing a maximum of 91.8 percent of pure diol) and 3 grams of an inhibitor, 2.6-di-tert-butyl-para-cresol, were added 600 cc. of a petroleum fraction (Shell solvent "140," boiling range 185–210 degrees) in a 3-neck flask equipped with a distilling head and heated in a bath of about 210 degrees centigrade. While stirring at this bath temperature audible dehydration took place and was completed in the course of one hour; the theoretical amount of water was carried over by the petroleum fraction azeotropically. Hot ethylene glycol (400 cc.) was then introduced cautiously into the mixture. As the remaining petroleum fraction was removed azeotropically the temperature of the bath was raised gradually. There was added a hot solution of 45 grams LiCl in 900 cc. ethylene glycol, the fraction changed and the azeotropical distillation of the p,p'-diisopropenyldiphenylmethane (DIDM), started. The temperature of the bath was kept around 240 degrees centigrade and hot ethylene glycol was added continuously in order to replace the carrier distilled; totally about 18,900 cc. of ethylene glycol were added. The yield was 178.8 grams of pure p,p'-diisopropenyldiphenylmethane (DIDM), melting at 50–2 degrees centigrade; bromine titration revealed the presence of 92.2 percent unsaturation.

Assuming the maximum theoretical content of the starting material (Diol) as 91.8 percent, 276 grams of pure diol should furnish 241 grams of DIDM.

The obtained amount of DIDM thus represents 74.2 percent yield of the theory.

The appetite depressant resin of the invention was formulated in 0.5 gram tablets and administered clinically to a series of obese patients for periods of 4 or more weeks. No special dietary regime other than the use of the resin, was instituted. In one group, 2 tablets were taken three times a day before meals, and 17 percent of the patients lost at least one pound per week. In a second group, 3 tablets were taken 3 times a day before meals, and 50 percent of the patients lost at least one pound per week. In a third group, 3 tablets were taken twice a day between meals and 56 percent of the patients lost at least one pound per week. From these and other tests doses of 2.0 grams of the resin taken twice daily between meals are believed to have the optimum weight reducing effect. No side effects were observed in any of the tests.

The appetite depressant resins may also be formulated in other convenient and conventional dosage forms for administration e.g. as wafers and capsules.

What is claimed is:
1. An appetite depressant resin comprising a swellable cross-linked 2-vinyl pyridine-p,p'-diisopropenyldiphenylmethane resin, wherein the amount of p,p'-diisopropenyldiphenylmethane cross-linking agent present is between about 1.3 and 1.8 percent by weight of the 2-vinylpyridine.

2. An appetite depressant resin comprising a swellable cross-linked 2-vinyl pyridine-p,p'diisopropenyldiphenylmethane resin, wherein the amount of p,p'-diisopropenyldiphenylmethane cross-linking agent present is between about 1.3 and 1.8 percent by weight of the 2-vinylpyridine, into which has been incorporated a food grade polymerization lubricant.

3. An appetite depressant resin comprising a swellable cross-linked 2-vinyl pyridine-p,p'-diisopropenyldiphenylmethane resin, wherein the amount of p,p'-diisopropenyldiphenylmethane cross-linking agent present is about 1.59 percent by weight of the 2-vinylpyridine.

4. The process of depressing the appetite which comprises the oral administration of the composition of claim 1.

References Cited in the file of this patent
UNITED STATES PATENTS
2,810,716   Markus _____ Oct. 22, 1957
OTHER REFERENCES
Am. J. of Pharmacy, vol. 126, No. 1, January 1954, pp. 10 and 17.